(12) United States Patent
El-Moussa

(10) Patent No.: US 11,658,996 B2
(45) Date of Patent: *May 23, 2023

(54) HISTORIC DATA BREACH DETECTION

(71) Applicant: British Telecommunications Public Limited Company, London (GB)

(72) Inventor: Fadi El-Moussa, London (GB)

(73) Assignee: British Telecommunications Public Limited Company, London (GB)

( * ) Notice: Subject to any disclaimer, the term of this patent is extended or adjusted under 35 U.S.C. 154(b) by 291 days.

This patent is subject to a terminal disclaimer.

(21) Appl. No.: 16/473,933

(22) PCT Filed: Dec. 19, 2017

(86) PCT No.: PCT/EP2017/083623
§ 371 (c)(1),
(2) Date: Jun. 26, 2019

(87) PCT Pub. No.: WO2018/122050
PCT Pub. Date: Jul. 5, 2018

(65) Prior Publication Data
US 2019/0356691 A1 Nov. 21, 2019

(30) Foreign Application Priority Data
Dec. 30, 2016 (EP) ..................... 16207656

(51) Int. Cl.
*H04L 9/40* (2022.01)
(52) U.S. Cl.
CPC ...... *H04L 63/1441* (2013.01); *H04L 63/1416* (2013.01)
(58) Field of Classification Search
CPC ................ H04L 63/1441; H04L 63/1416
(Continued)

(56) References Cited

U.S. PATENT DOCUMENTS 6,618,718 B1 * 9/2003 Couch .................. G06F 16/217
707/718
8,204,984 B1 * 6/2012 Aziz .................. H04L 63/0227
709/224
(Continued)

FOREIGN PATENT DOCUMENTS

WO WO-2016028442 A1 2/2016
WO WO-2016053514 A1 4/2016

OTHER PUBLICATIONS

International Search Report and Written Opinion for Application No. PCT/EP2017/083623, filed Dec. 19, 2017, dated Apr. 12, 2018 (9 pgs).

(Continued)

*Primary Examiner* — Badri Narayanan Champakesan
(74) *Attorney, Agent, or Firm* — Patterson Thuente, P.A.

(57) ABSTRACT

A computer implemented method to detect a data breach in a network-connected computing system, the method including storing, at a trusted secure computing device, at least a portion of network traffic communicated with the computer system; the computing device generating a copy of data distributed across a network; the computing device identifying information about the network attack stored in the copy of the data; the computing device generating a signature for the network attack based on the information about the network attack, the signature including rules for identifying the network attack in network traffic; and identifying an occurrence of the network attack in the stored network traffic based on the signature.

11 Claims, 6 Drawing Sheets

(58) Field of Classification Search
USPC .......................................................... 726/23
See application file for complete search history.

(56) References Cited

U.S. PATENT DOCUMENTS

| | | | |
|---|---|---|---|
| 8,429,180 | B1 | 4/2013 | Sobel et al. |
| 8,495,384 | B1 | 7/2013 | Deluccia |
| 8,782,790 | B1* | 7/2014 | Smith ................. H04L 63/1441 |
| | | | 726/24 |
| 8,806,629 | B1 | 8/2014 | Cherepov et al. |
| 8,904,531 | B1 | 12/2014 | Saklikar et al. |
| 9,027,135 | B1 | 5/2015 | Aziz |
| 9,071,638 | B1* | 6/2015 | Aziz ..................... G06F 21/568 |
| 9,342,695 | B2 | 5/2016 | Barkan |
| 9,485,262 | B1* | 11/2016 | Kahn ................. H04L 63/1433 |
| 9,560,072 | B1* | 1/2017 | Xu .......................... H04L 41/12 |
| 9,565,202 | B1* | 2/2017 | Kindlund .............. H04L 63/145 |
| 9,591,023 | B1* | 3/2017 | McClintock ............ G06F 21/60 |
| 10,027,689 | B1* | 7/2018 | Rathor ................ H04L 63/1416 |
| 10,268,840 | B2 | 4/2019 | Lockhart, III et al. |
| 10,332,056 | B2* | 6/2019 | Yang ................ G06Q 10/06395 |
| 10,452,630 | B2* | 10/2019 | Tariq ................. G06F 16/24539 |
| 10,454,950 | B1* | 10/2019 | Aziz ................... H04L 63/1425 |
| 10,523,686 | B1 | 12/2019 | Mehta et al. |
| 2005/0114707 | A1* | 5/2005 | DeStefano .......... H04L 63/1416 |
| | | | 726/4 |
| 2006/0026423 | A1 | 2/2006 | Bangerter et al. |
| 2007/0094728 | A1* | 4/2007 | Julisch ................ H04L 63/1491 |
| | | | 726/23 |
| 2010/0070800 | A1 | 3/2010 | Hanna |
| 2010/0121872 | A1 | 5/2010 | Subramaniam |
| 2012/0005147 | A1 | 1/2012 | Nakakoji et al. |
| 2012/0130980 | A1 | 5/2012 | Wong et al. |
| 2012/0158626 | A1 | 6/2012 | Zhu et al. |
| 2012/0304244 | A1* | 11/2012 | Xie .......................... G06F 21/00 |
| | | | 726/1 |
| 2013/0117852 | A1* | 5/2013 | Stute ....................... G06F 21/55 |
| | | | 726/23 |
| 2013/0263226 | A1* | 10/2013 | Sudia ...................... G06F 21/60 |
| | | | 726/4 |
| 2015/0033340 | A1* | 1/2015 | Giokas ................ H04L 63/1433 |
| | | | 726/23 |
| 2015/0242637 | A1 | 8/2015 | Tonn et al. |
| 2015/0242639 | A1 | 8/2015 | Galil et al. |
| 2015/0372980 | A1* | 12/2015 | Eyada ..................... G06F 21/55 |
| | | | 726/1 |
| 2016/0028750 | A1 | 1/2016 | Di Pietro et al. |
| 2016/0044054 | A1* | 2/2016 | Stiansen ............. H04L 63/1416 |
| | | | 726/24 |
| 2016/0094573 | A1* | 3/2016 | Sood ...................... G06F 21/554 |
| | | | 726/1 |
| 2016/0323301 | A1 | 11/2016 | Boss et al. |
| 2017/0013018 | A1* | 1/2017 | Nakata ................ H04L 12/6418 |
| 2017/0041334 | A1 | 2/2017 | Kahn et al. |
| 2017/0093910 | A1* | 3/2017 | Gukal ................. H04L 63/1416 |
| 2017/0149830 | A1* | 5/2017 | Kim ........................ H04L 63/20 |
| 2017/0155671 | A1 | 6/2017 | Hovor et al. |
| 2017/0155677 | A1 | 6/2017 | Shakarian et al. |
| 2017/0161746 | A1* | 6/2017 | Cook ........................ H04L 9/14 |
| 2017/0262629 | A1* | 9/2017 | Xu ........................ G06F 21/53 |
| 2017/0264626 | A1* | 9/2017 | Xu ........................ H04L 63/145 |
| 2017/0286549 | A1* | 10/2017 | Chandnani .............. G06F 16/81 |
| 2018/0007087 | A1 | 1/2018 | Grady et al. |
| 2018/0191751 | A1 | 7/2018 | El-Moussa |

OTHER PUBLICATIONS

Combined Search and Examination Report under Sections 17 and 18(3) for GB Application No. 1622447.9 dated Jun. 27, 2017, 5 pages.
Combined Search and Examination Report under Sections 17 and 18(3) for GB Application No. 1622450.3 dated Jun. 21, 2017, 7 pages.
Combined Search and Examination Report under Sections 17 and 18(3) for GB Application No. 1622451.1 dated Jun. 21, 2017, 6 pages.
Combined Search and Examination Report under Sections 17 and 18(3) for GB Application No. 1721321.6 dated Jun. 14, 2018, 6 pages.
Communication pursuant to Article 94(3) EPC For European Application No. 17816875.3, dated May 3, 2021, 7 pages.
European Search Report for European Application No. 16207657.4, dated Feb. 3, 2017, 9 pages.
European Search Reportfor European Application No. EP16207659.0 dated Apr. 3, 2017, 9 pages.
International Preliminary Report on Patentability for Application No. PCT/EP2017/083621, dated Jul. 11, 2019, 9 pages.
International Preliminary Report on Patentability for Application No. PCT/EP2017/083623, dated Jul. 11, 2019, 8 pages.
International Preliminary Report on Patentability for Application No. PCT/EP2017/083624, dated Jul. 11, 2019, 8 pages.
International Search Report and Written Opinion for Application No. PCT/EP2017/083621, dated Feb. 28, 2018, 11 pages.
International Search Report and Written Opinion for Application No. PCT/EP2017/083624, dated Feb. 13, 2018, 10 pages.
Kreibich C., et al., "Honeycomb—Creating Intrusion Detection Signatures using Honeypots", Workshop on Hot Topics in Networks (Hotnets-II), Nov. 2003, 6 pages.
Lemos R., et al., "Startup Aims to Scour the Dark Web for Stolen Data," MIT Technology Review, Jun. 3, 2015, retrieved from https://www.technologyreview.com/s/537921 /startup-aims-to-scour-the-dark-web-for-stolen-data/, 4 pages.
Mertens X., "Monitoring pastebin.com within your SIEM," Jan. 17, 2012, retrieved from https://blog.rootshell.be/2012/01/17/monitoring-pastebin-com-within-your-siem, on Jun. 26, 2019, 29 pages.
Rashid A., et al., "Detecting and Preventing Data Exfiltration," Lancaster University, Security Lancaster, 2014, 40 pages.
Shu X., et al., "Fast Detection of Transformed Data Leaks", IEEE Transactions on Information Forensics and Security,INSPEC accession No. 15670975, XP011594895, vol. 11 (3), Mar. 2016, 15 pages.
Waddell K., "The Spider That Crawls the Dark Web Looking for Stolen Data," The Atlantic, Feb. 22, 2016, Retrieved from https://www.theatlantic.com/technology/archive/2016/02/the-spider-that-crawls-the-dark-web-looking-for-stolen-data/470220/, 7 pages.

* cited by examiner

HISTORIC DATA BREACH DETECTION

CROSS-REFERENCE TO RELATED APPLICATION

The present application is a National Phase entry of PCT Application No. PCT/EP2017/083623, filed Dec. 19, 2017, which claims priority from European Patent Application No. 16207656.6 filed Dec. 30, 2016, each of which is fully incorporated herein by reference.

TECHNICAL FIELD

The present disclosure relates to the detection of a data breach in a network-connected computer system.

BACKGROUND

Secure data such as sensitive, protected, private or confidential data stored in or by a network-connected computer system is susceptible to access and/or disclosure to an untrusted environment such as the public internet. Such access or disclosure can occur intentionally or unintentionally and is known as a data breach, information disclosure, data leak or data spill. A data breach may not be identified by a data owner or other entity responsible for or interested in the data and appropriate protective, remediative or responsive actions will generally not take place until a data breach is detected, leading to periods of exposure where data that is thought to be secure actually is not.

SUMMARY

Thus, there is a need to detect a data breach when it has occurred.

The present disclosure accordingly provides, in a first aspect, a computer implemented method to detect a data breach in a network-connected computing system, the method comprising: storing, at a trusted secure computing device, at least a portion of network traffic communicated with the computer system; the computing device generating a copy of data distributed across a network; the computing device identifying information about the network attack stored in the copy of the data; the computing device generating a signature for the network attack based on the information about the network attack, the signature including rules for identifying the network attack in network traffic; identifying an occurrence of the network attack in the stored network traffic based on the signature.

In some embodiments the information about the network attack includes at least a portion of code or script for carrying out the network attack and the signature identifies the network attack based on the portion.

In some embodiments the information about the network attack includes at least a portion of data obtained by the network attack and the signature identifies the network attack based on characteristics of the obtained data.

In some embodiments the characteristics of the obtained data include: one or more of an identification of, data type of, number of and order of data fields in the data; metadata associated with the data; and/or the content of the data.

In some embodiments the method further comprises identifying a subset of the stored network traffic associated with the attack based on the signature.

In some embodiments the subset of stored network traffic includes network traffic communicated between communication endpoints involved in network traffic corresponding to the signature, such endpoints being compromised endpoints.

In some embodiments the method further comprises identifying data stored and/or communicated by or via compromised endpoints as compromised data.

In some embodiments the compromised data is identified as discredited and/or invalidated.

In some embodiments the compromised data is associated with one or more computing services for generating, accessing and/or processing the compromised data and the method further comprises: implementing protective measures in respect of the computing services.

In some embodiments the compromised data includes one or more of: at least part of an authentication credential; an access token; a certificate; a key and/or an authorization data item.

In some embodiments the compromised data includes at least part of an authentication credential and the authentication credential is revoked in response to the identification of the compromised data.

The present disclosure accordingly provides, in a second aspect, a computer system including a processor and memory storing computer program code for performing the methods set out above.

The present disclosure accordingly provides, in a third aspect, a computer program element comprising computer program code to, when loaded into a computer system and executed thereon, cause the computer to perform the methods set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
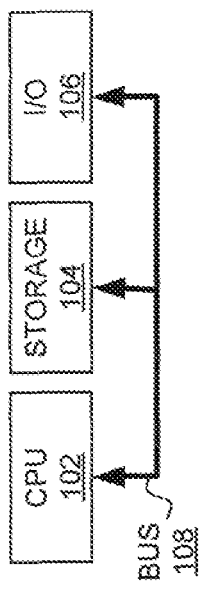
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
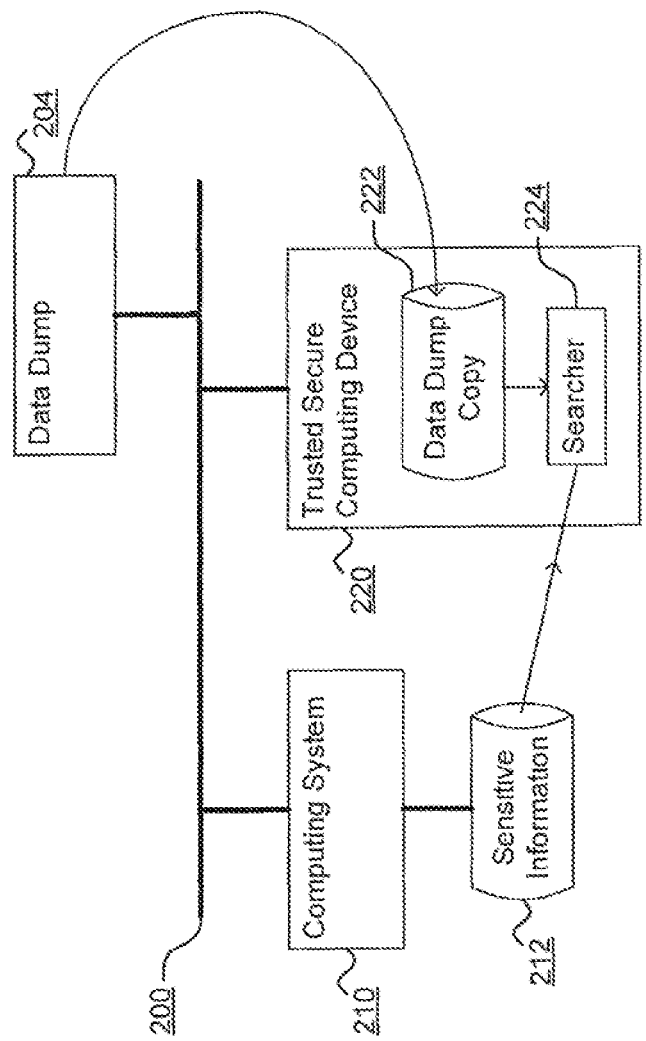
FIG. 2 is a component diagram of a trusted secure computing device for detecting a data breach in accordance with embodiments of the present disclosure.

FIG. 2 is a component diagram of a trusted secure computing device 220 for detecting a data breach in accordance with embodiments of the present disclosure. The trusted secure computing device 220 is a hardware, software, firmware, physical, virtual or combination component operable to communicate via a communications network 200 such as a wired, wireless or combination network. For example, the communications network 200 is a public network such as the interne. Also in communication with the network 200 is a computing system 210 and a data dump 204. The computing device 210 has associated sensitive information 212 stored with, alongside, within or by and accessible to the computing device 210. The sensitive information 212 can include data that is commercially, personally or technically sensitive. For example, the sensitive information 212 can include personal details of individuals, companies or other entities, financial information, confidential information, trade secrets, plans, projections or the like. Alternatively, the sensitive information can include technically sensitive information such as access or authentication credentials, cryptographic information such as keys, authentication information, configuration information, access control information, certificate(s), authorization data item(s) and the like. The scope of the type of information that can be considered sensitive information 212 is very broad and can be subjective to one or more information owners or users, though the information is characterized by being information that is not generally available without special permission, authorization, access, subscription or the like. Thus, it is intended that the sensitive information 212 is not generally available via the network 200.

In the arrangement of FIG. 2 data is stored in communication with the network 200 as a data dump 204. The data dump 204 can be a database storing data, a website hosting data, a network file system having data or any other network connected mechanism through which the data of data dump 204 is generally accessible via the network 200. For example, the data dump 204 is stored in a public information or data exchange facility such as an internet website for exchanging data publicly. One such site is pastebin.com. In some embodiments, the data dump 204 can be provided by an anonymized service such as a web server operating in the Tor network or an underground network known generally as the "dark web". The data dump 204 includes at least a portion of the sensitive information 212 arising as a result of a data breach. The nature and cause of the data breach is not relevant here though it will be clear to those skilled in the art that such a data breach leading to the public availability of sensitive information 212 can include intentional or unintentional disclosure, access or retrieval of the data and provision of the data as data dump 204 in a manner accessible via the network 200. For example, the portion of sensitive information 212 may be obtained by network attack, unauthorized access or other malicious activity involving the computer system 210, the sensitive information 212 and/or the network 200. Alternatively, the data breach may result from negligence in relation to the computing system 210 such as inadvertent or negligent management, operation or handling of the computing system 210 rendering the sensitive information 212 vulnerable to disclosure. The sensitive information 212 could be provided on a portable storage or computing device that is lost, stolen, mislaid or accessed by an unauthorized operator. Other such causes of a data breach will be apparent to those skilled in the art.

The availability of at least a portion of the sensitive information 212 as data dump 204 thus constitutes a data breach. The trusted secure computing device 220 is operates and is operated in a trusted and secure manner such that its processing and data is protected from disclosure such as via the network 200. The trusted secure computing device 220 generates a copy of the data dump 204 accessible to the device 220. The copy 222 can be whole or partial. The trusted secure device 220 further includes a searcher 224 component as a hardware, software, firmware or combination component adapted to access the sensitive information 212 and search for any part of the sensitive information 212 in the data dump copy 222. In some embodiments the trusted secure computing device 220 is operated in a mode whereby the trusted secure device 222 is disconnected from the network 200 while the device 222 accesses the sensitive information 212 so as to preclude data breach of the sensitive information 212 via the network 200. Further, in some embodiments the searcher 224 of the trusted secure computing device 220 accesses the sensitive information 212 other than via the network 200 such as via a separate, private, secure and trusted communication means between the trusted secure computing device 220 and the sensitive information 212. Alternatively, the sensitive information 212 can be encrypted or otherwise protected for communication to or access by the trusted secure computing device 220.

Thus, the trusted secure computing device 220 is operable to identify any portion of sensitive information 212 in the data dump copy 222 and thus in the data dump 204. Accordingly, the trusted secure device 220 detects a data breach where sensitive information 212 is included in the data dump 204. Where a positive determination of a data breach is made by the trusted secure device 220 responsive and/or remedial measures can be implemented.

Where a data breach of some portion of sensitive information 212 is known to have occurred, the sensitive information 212 can be identified as disclosed, breached, discredited and/or invalidated. For example, where the sensitive information is authentication, authorization, access control or other security information such a passwords, keys, identification information and the like, such information can be invalidated and resources normally accessed or protected by such information can be terminated, disconnected, enter an elevated security state, be further protected and/or removed from network access until trust can be resumed.

Further, where the computing system 210 is associated with the sensitive information 212 and includes, controls or operates with computer services for generating, accessing and/or processing the sensitive information 212, a positive determination of a data breach of sensitive information 212 can result in the implementation of protective measures in respect of the computing system 210 or computing services executing, operating or running thereon or therewith.

Figure 3:
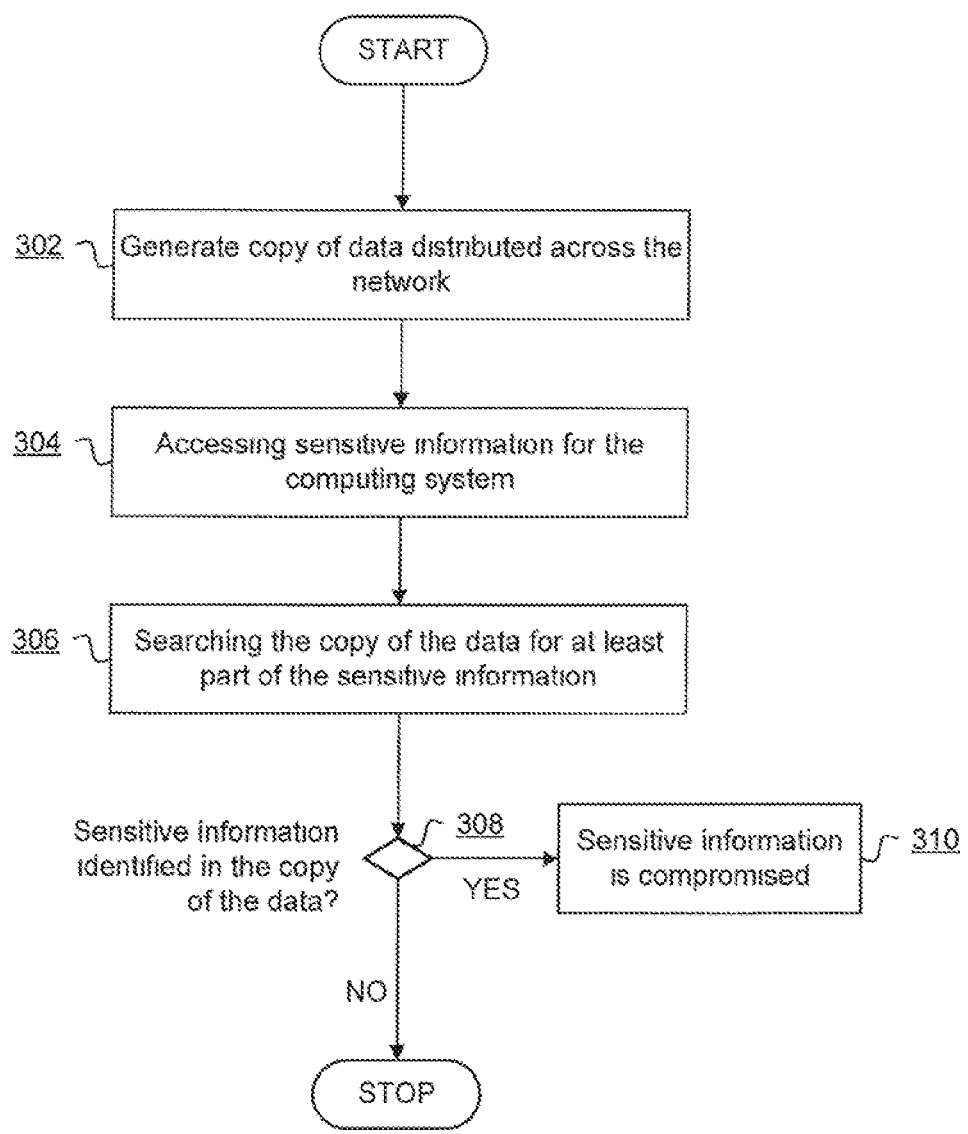
FIG. 3 is a flowchart of a method to detect a data breach in accordance with embodiments of the present disclosure.

FIG. 3 is a flowchart of a method to detect a data breach in accordance with embodiments of the present disclosure. Initially, at 302, the trusted secure computing device 220 generates a copy 222 of data distributed across a network such as the data dump 204. At 304 the trusted secure computing device 220 accesses accessing sensitive information 212 for or associated with the computer system 210. In some embodiments trusted secure computing device 220 is disconnected from the network 200 during access to the sensitive information 212. At 306 the trusted secure computing device 220 searches for at least part of the sensitive information 212 in the copy of the data 222. At 308 the method determines if at least some portion of the sensitive information 212 is identified in the copy of the data 222 and a positive determination indicates a data breach of the sensitive information at 310. Thus from 310 remedial, protective and/or responsive actions can be performed.

Some causes of data breach include malicious attacks on the network-connected computer system 210 and the unauthorized access or retrieval of at least some portion of the sensitive data 212. Such attacks can be caused by malicious software and/or users operating via the network 200 including: malicious network communication; malicious scripts; malicious executable code; malicious database queries; exploitation of computing service vulnerabilities; and other types and means of attack as will be apparent to those skilled in the art.

Individuals involved in such attacks or other parties can take pride or interest in the techniques employed to attack a computing system and can share those techniques publicly such as via data 404 stored in a manner accessible via the network 200, such as a website, pastebin dump or the like. For example, information about a network attack can be shared such as scripts, executable code, source code, database query statements, combination of these and other information used to carry out an attack as will be apparent to those skilled in the art. Such information about a network attack can be stored as data 404 connected to the network 200 for others to access and reuse to launch new attacks on potentially different targets on potentially different networks.

Furthermore, other information about a network attack may be discerned from data 404 made available via the network 200. For example, the output (or data dump) of an attack may be provided as data 404 such as a database query output, the output of a sensitive computing system, sensitive information 212 structured in a particular way and the like. Such data 404 constitutes information about a network attack and characteristics of the data 404 can indicate characteristics of the mechanism employed to obtain, structure, format, display or communicate the data. For example, a database query report resulting from the execution of a database query contains data fields (e.g. columns) that can depend on the executed query itself. Thus, a structured query language (SQL) "SELECT" statement followed by an enumerated list of columns (e.g. "SELECT COLUMNA, COLUMNB, COLUMNC") can be inferred from a database report including only those columns. Accordingly, information about the attack can be inferred from characteristics of the data 404 where the data is generated, reported, received or communicated based on the attack.

In accordance with embodiments of the present disclosure, information about a network attack stored in data 404 accessible via the network 200 is used to generate a signature for the network attack such that the network attack can be detected in future based on the signature. A signature of a network attack includes one or more rules and/or patterns reflecting characteristics of the attack that can be used to detect the attack. For example, a signature can be defined based on byte sequences in malicious network traffic or known malicious instruction sequences used by malicious software. Where data 404 includes a particular script, executable code, query or the like then characteristics of such data can be used to formulate the signature. Similarly, where data 404 includes an identification of characteristics of the attack such as data fields selected in a query or the like then such data can be used to formulate the signature. Combinations of such information can also be used to formulate signatures for detecting a network attack.

Figure 4:
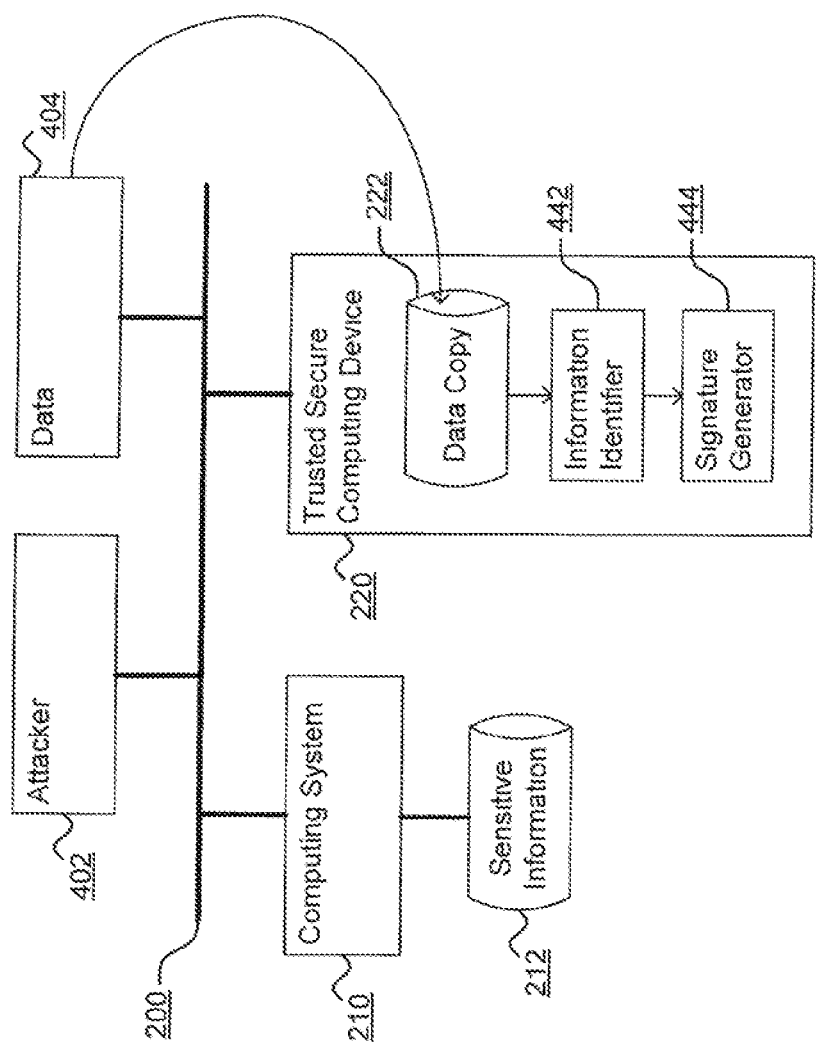
FIG. 4 is a component diagram of a trusted secure computing device for generating a signature of a network attack in accordance with embodiments of the present disclosure.

FIG. 4 is a component diagram of a trusted secure computing device 220 for generating a signature of a network attack in accordance with embodiments of the present disclosure. Many of the features of FIG. 4 are identical to those described above with respect to FIG. 2 and these will not be repeated here. FIG. 4 further includes an attacker 402 entity such as a computing device or system from which an attack is or may be launched and from or by which information about the attack is stored as data 404 accessible via the network 200. The trusted secure computing device 220 of FIG. 4 generates a copy of the data 404 as data copy 222 substantially as was performed for the data dump 204 of FIG. 2. In some embodiments, the trusted secure computing device 220 of FIG. 4 need not store a local copy of data 404 and can operate directly with the data 404 via the network 200. Accordingly, subsequent references herein to the data copy 222 can, in such alternative embodiments, be read as referring to the data 404 accessed via the network 200. The trusted secure computing device 220 of FIG. 4 further includes an information identifier 442 as a software, hardware, firmware or combination component for identifying information about the network attack stored in the data copy 222. For example, the information identifier 442 can scan, parse or otherwise process the data copy 222 to identify code or scripts that are, or potentially are, for carrying out an attack. Further, the information identifier 442 can scan, parse or otherwise process the data copy 222 to identify characteristics of the data on which basis a signature can be generated for the attack. The trusted secure computing device 220 of FIG. 4 further includes a signature generator 444 for generating the signature based on the information about the network attack obtained by the information identifier 442. Thus, in this way, a signature for the network attack can be generated based on the data 404 for detecting the network attack in a network.

Figure 5:
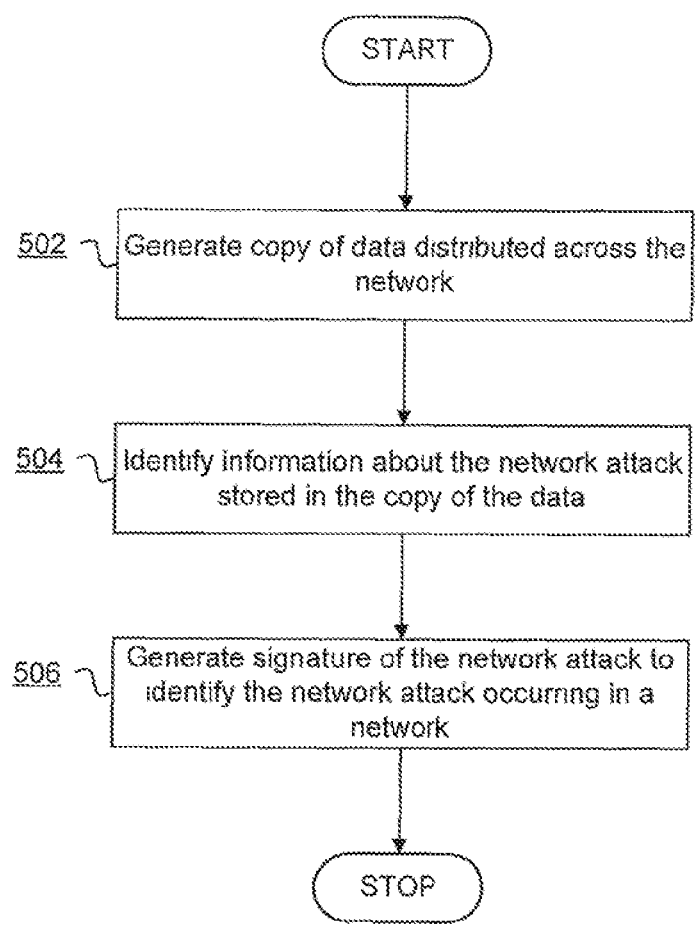
FIG. 5 is a flowchart of a method to generate a signature of a network attack in accordance with embodiments of the present disclosure.

FIG. 5 is a flowchart of a method to generate a signature of a network attack in accordance with embodiments of the present disclosure. Initially, at 502, the trusted secure computing device 220 generates a copy of the data 404 distributed across and accessible via the network 200. At 504 information about the network attack stored in the copy of the data is identified by the information identifier 442. At 506 the signature generator 444 generates a signature for the network attack based on the information about the network attack so as to subsequently identify the network attack occurring on a computer network.

The identification of network attacks based on the signature assists in preventing, responding to, remediating or otherwise handing such attacks. However, in some scenarios the data 404 including information about the attack may not be recent data. For example, the data 404 may be data arising from a data breach occurring a relatively long time ago such as data that was not immediately disclosed, published or hosted for access via the network 200 or data that was not discovered until more recently. Accordingly, the information about the attack contained in the data 404 may have been used in one or more attacks occurring in the intervening period and a data breach of sensitive information 212 associated with the computing system 210 may have occurred. In such situations owners, users or other parties with interest in the sensitive information 212 may be unaware that some portion of the sensitive data 212 has previously been implicated in a network attack that may result in data breach. Accordingly, it is advantageous to identify the occurrence of a network attack even where the attack is in the past.

Figure 6:
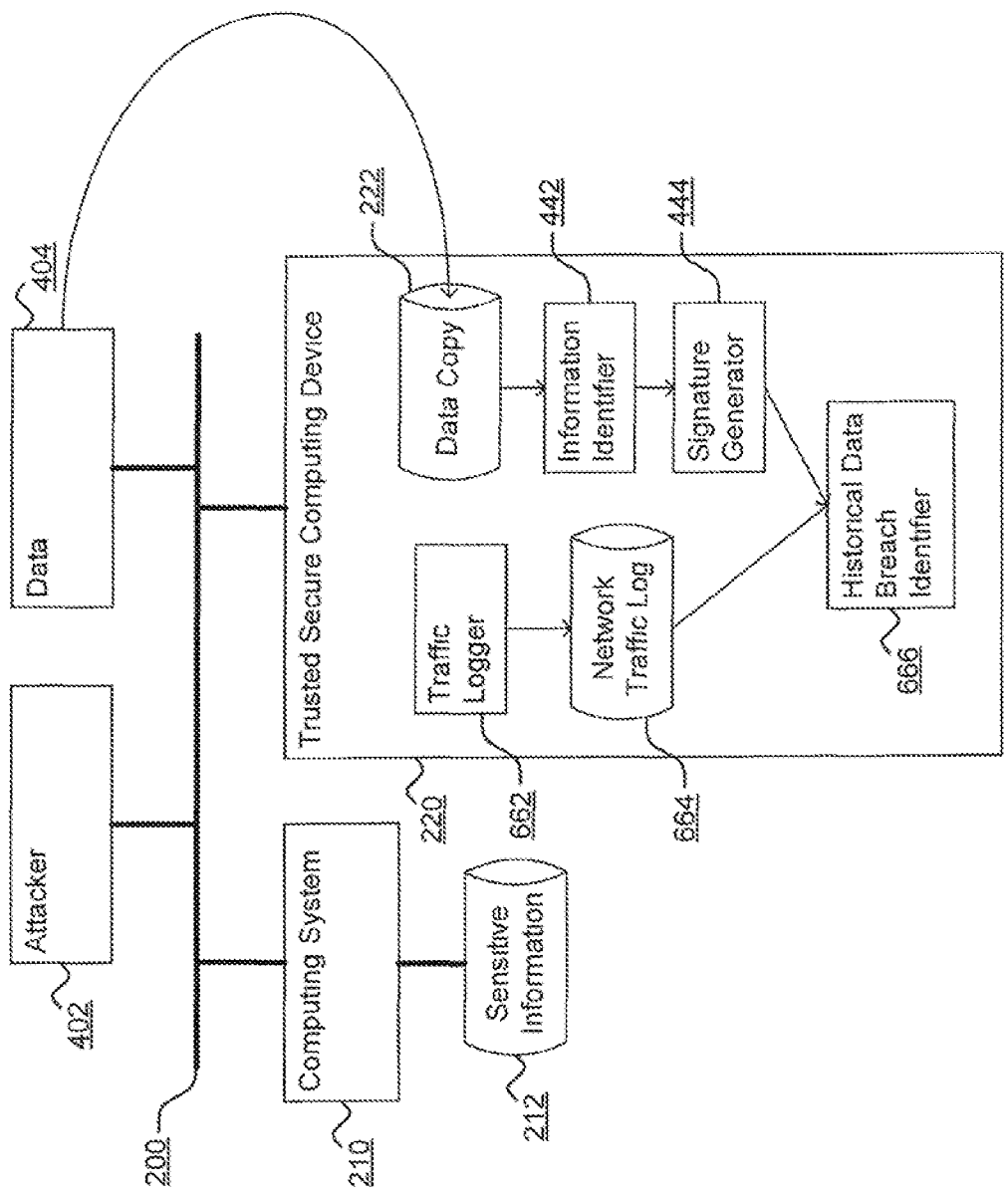
FIG. 6 is a component diagram of a trusted secure computing device for detecting a data breach in accordance with embodiments of the present disclosure.

FIG. 6 is a component diagram of a trusted secure computing device 220 for detecting a data breach in accordance with embodiments of the present disclosure. Many of the elements of FIG. 6 are identical to those described above with respect to FIGS. 2 and/or 4 and these will not be repeated here. The trusted secure computing device 220 of FIG. 6 further includes a traffic logger 662 as a software, hardware, firmware or combination component for receiving, obtaining, intercepting or otherwise accessing network traffic communicated via the network 200 and storing the network traffic in a network traffic log 664. In some embodiments network traffic associated with a particular computing system, device or service is stored, such as traffic communicated to and from the computing system 210. The network traffic log 664 thus stores network traffic over a period of time on which basis the occurrence of a historical network attacks can be evaluated. In use the trusted secure computing device 220 of FIG. 6 employs the signature generated by the signature generator 444 as previously described. The signature may be of relatively recent generation vis-à-vis the traffic stored in the traffic log 664 which may include traffic that is relatively older. The trusted secure computing device 220 of FIG. 6 further includes a historical data breach identifier 666 as a hardware, software, firmware or combination component for checking the network traffic in the log 664 to identify the occurrence of a network attack based on the traffic signature 444. Thus, where a positive determination of a network attack is identified in the network traffic log 664 then the trusted secure computing device 220 identifies a prior network attack that may have compromised the sensitive information 212. In response to such a positive determination, remedial, responsive or protective action can be taken. For example, at least some portion of the sensitive information can be identified as disclosed, breached, discredited and/or invalidated as previously described. In this way, potentially historic network attacks and corresponding data breaches can be identified and responsive action taken.

Figure 7:
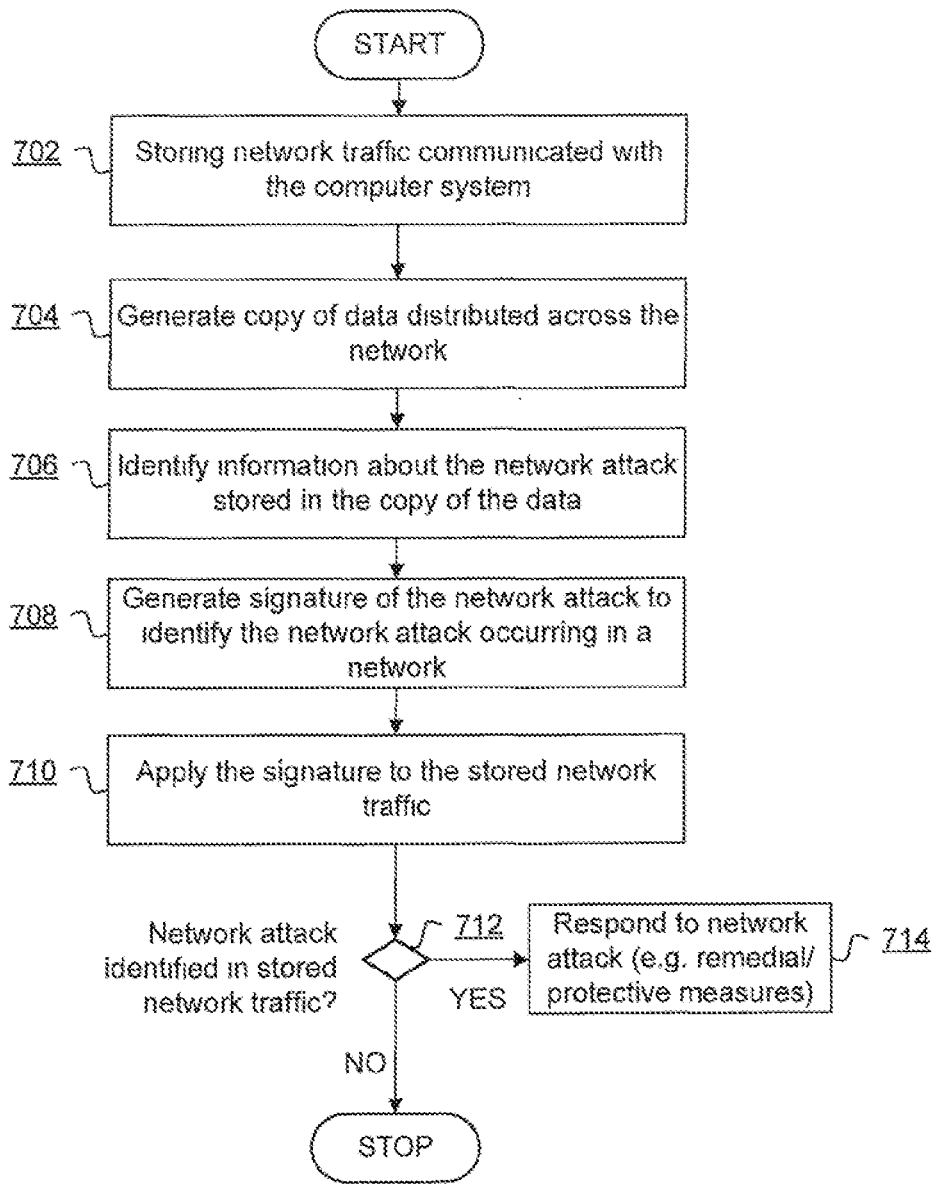
FIG. 7 is a flowchart of a method to detect a data breach in accordance with embodiments of the present disclosure.

FIG. 7 is a flowchart of a method to detect a data breach in accordance with embodiments of the present disclosure. Initially, at 702, the trusted secure computing device 220 stores at least a portion of network traffic communicated with the computer system 210 via the network 200. At 704 a copy 222 of data 404 distributed across a network is generated. In some embodiments, the copy 222 need not be generated and the trusted secure computing device 220 operates directly with the data 404 accessible via the network 200. At 706 information about the network attack stored in the copy 222 of the data is identified. At 708 a signature for the network attack is generated based on the information about the network attack. The signature included patterns and/or rules for identifying the network attack in network traffic. At 710 the signature is used to identify an occurrence of the network attack in the stored network traffic log 664. At 712, where a network attack is identified from the network traffic log 664, responsive action is taken at 714.

Insofar as embodiments described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to detect a data breach in a network-connected computing system, the method comprising:

storing, at a trusted secure computing device, at least a portion of network traffic communicated with the computer system;

generating, by the trusted secure computing device, a copy of a data dump distributed across a network;

identifying, by the trusted secure computing device, information about a network attack stored in the copy of the data dump, the information about the network attack comprising at least one characteristic indicative of a method used to obtain the data dump or a portion of data obtained by the network attack;

generating, by the trusted secure computing device, a signature for the network attack including rules or patterns for identifying the network attack in network traffic, the signature being based on characteristics of the portion of obtained data that include at least one of:
one or more of an identification, data type, number or order of data fields in the portion of obtained data;
metadata associated with the portion of obtained data; or
the content of the portion of obtained data; and identifying an occurrence of the network attack in the stored portion of network traffic based on the generated signature.

2. The method of claim 1, wherein the identified information about the network attack includes at least a portion of code or script for carrying out the network attack, and the signature identifies the network attack based on the at least a portion of code or script.

3. The method of claim 1, further comprising identifying a subset of the stored network traffic associated with the attack based on the signature.

4. The method of claim 3, wherein the subset of stored network traffic includes network traffic communicated between communication endpoints involved in network traffic corresponding to the signature, the communication endpoints being compromised communication endpoints.

5. The method of claim 4, further comprising identifying data stored or communicated by or via compromised endpoints as compromised data.

6. The method of claim 5, wherein the compromised data is identified as discredited or invalidated.

7. The method of claim 5, wherein the compromised data is associated with one or more computing services for generating, accessing or processing the compromised data, and the method further comprises implementing protective measures in respect of the one or more computing services.

8. The method of claim 5, wherein the compromised data includes one or more of at least part of an authentication credential; an access token; a certificate; a key; or an authorization data item.

9. The method of claim 5, wherein the compromised data includes at least part of an authentication credential, and the authentication credential is revoked in response to the identification of the compromised data.

10. A computer system comprising:
a processor and memory storing computer program code for detecting a data breach in a network-connected computing system by:
storing, at a trusted secure computing device, at least a portion of network traffic communicated with the computer system;
generating, by the trusted secure computing device, a copy of a data dump distributed across a network, the data dump including sensitive information arising as a result of a data breach;
identifying, by the trusted secure computing device, information about a network attack stored in the copy of the data dump, the information about the network attack comprising at least one characteristic indicative of a method used to obtain the data dump or a portion of data obtained by the network attack;
generating, by the trusted secure computing device, a signature for the network attack including rules or patterns for identifying the network attack in network traffic, the signature being based on characteristics of the portion of obtained data that include at least one of:
one or more of an identification, data type, number or order of data fields in the portion of obtained data;
metadata associated with the portion of obtained data; or
the content of the portion of obtained data; and
identifying an occurrence of the network attack in the stored portion of network traffic based on the generated signature.

11. A non-transitory computer-readable storage element storing computer program code to, when loaded into a computer system and executed thereon, cause the computer system to detect a data breach in a network-connected computing system by:
storing, at a trusted secure computing device, at least a portion of network traffic communicated with the computer system;
generating, by the trusted secure computing device, a copy of a data dump distributed across a network, the data dump including sensitive information arising as a result of a data breach;
identifying, by the trusted secure computing device, information about a network attack stored in the copy of the data dump, the information about the network attack comprising at least one characteristic indicative of a method used to obtain the data dump or a portion of data obtained by the network attack;
generating, by the trusted secure computing device, a signature for the network attack including rules or patterns for identifying the network attack in network traffic, the signature being based on characteristics of the portion of obtained data that include at least one of:
one or more of an identification, data type, number or order of data fields in the portion of obtained data;
metadata associated with the portion of obtained data; or
the content of the portion of obtained data; and
identifying an occurrence of the network attack in the stored portion of network traffic based on the generated signature.

* * * * *